Dec. 27, 1938.   H. WAMSER   2,141,574
PAPER CUTTING APPLIANCE
Filed Sept. 27, 1937
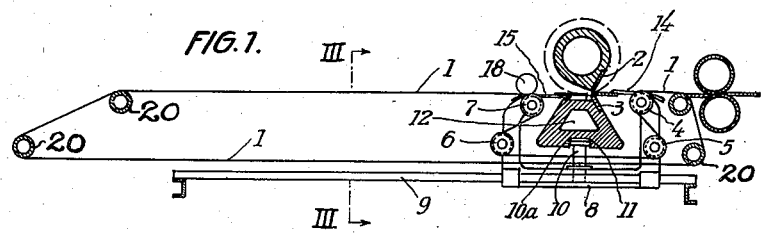
FIG. 1.
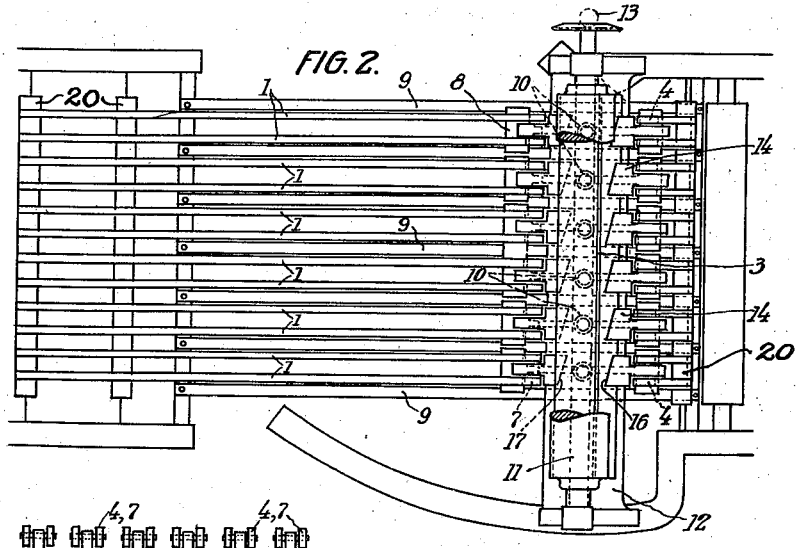
FIG. 2.
FIG. 3.
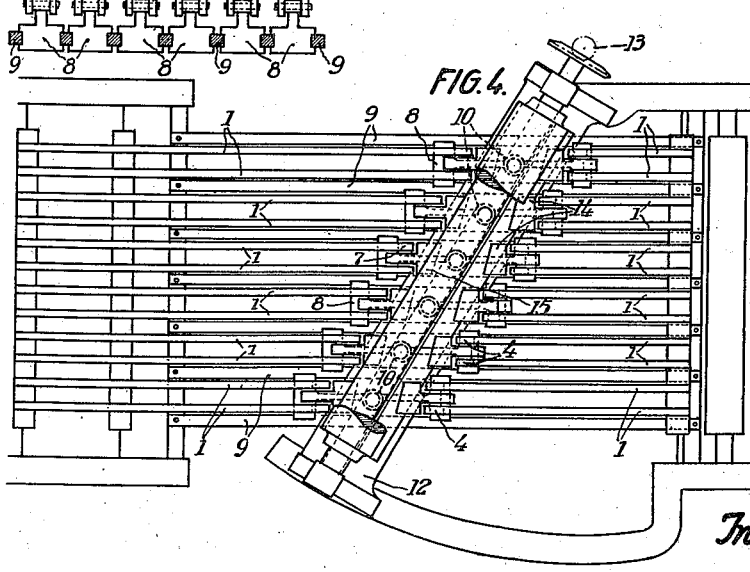
FIG. 4.
Inventor:
H. Wamser
By: Glascock Downing & Seebold
Attys.

Patented Dec. 27, 1938

2,141,574

UNITED STATES PATENT OFFICE 2,141,574

PAPER-CUTTING APPLIANCE

Heinrich Wamser, Chemnitz-Borna, Germany

Application September 27, 1937, Serial No. 165,980
In Germany December 23, 1936

8 Claims. (Cl. 164—68)

In transverse and diagonal cutting appliances conveyer bands are used, for bringing the web of paper to the cutting station and for conveying away the cut sheets. These conveyer bands are led by guide rollers either around the lower cutter beam or, in another constructional form, through the cutter beam. In both known constructional forms the conveyer bands are so arranged that on the cutter beam being placed obliquely, the distance between the individual conveyer bands is reduced. The result of this is that, when making a right-angled cut, the conveyer bands and the guiding parts thereof occupy a considerable width which is frequently not at all necessary, that is to say, when a right-angled cut is being made, the conveyer bands will in part lie outside the actual width of paper or cloth, whilst, when an oblique cut is being made, the bands just correspond to the width of the paper. This constructional form not only has the disadvantage of a great width of the transverse cutter or of the parts serving for guiding the conveyer bands, but has the further disadvantage that the guide rollers have to be displaced transversely with respect to the conveyer bands and suitably set. This entails the danger, that the guiding means or rockable support of the guiding rollers may become jammed and that the guiding rollers will not set themselves properly, with the result that the bands will jump off.

The disadvantages above referred to are overcome by the present invention. More particularly the invention enables the conveyer bands to be always arranged at the same invariable distance from one another, so that the total width between the outer conveyer bands for a right-angled cut and for a diagonal cut is always the same. The means according to the invention for guiding the conveyer bands is particularly suitable for transverse cutters, with which a very broad diagonal cut may be required to be performed.

The invariable distance apart of the conveyer bands is made possible according to the invention through the guiding rollers for the conveyer bands being displaceable only in the longitudinal direction of the bands, whilst in the transverse direction of the conveyer bands they are always kept at the same distance from one another. According to the invention the conveyer band guiding rollers or their bearing supports are mounted on guide rails, which are parallel to the conveyer bands and are arranged at a fixed distance apart, independently of the cutter beam and of each other and are connected with the cutter beam by a driving member.

In the drawing a constructional example of the invention is illustrated.

Fig. 1 is a longitudinal section through the guiding means of the conveyer bands of a transverse cutter, Fig. 2 a plan view of the guiding means for the conveyer bands of the transverse cutter shown in Fig. 1, Fig. 3 a section on line III—III of Fig. 1, Fig. 4 a guiding means for the conveyer band, according to Fig. 2, with the cutter beam placed obliquely.

In the drawing the reference numeral 1 indicates the endless conveyer bands of a transverse cutter, which are guided round the cutter beam 12 by means of guide rollers 4 to 7. The bands or belts 1 pass at their outer ends around stationary rollers 20, any one of which may be driven by a power source for moving the belts. 3 is the lower cutter and 2 the upper cutter which is mounted on a drum and rotates therewith. In the particularly advantageous constructional form illustrated in the drawing, all four guide rollers 4 to 7 which serve for guiding a conveyer band around the cutter beam 12 are mounted on a single support 8 which seen from the side according to Fig. 1 has somewhat the form of a U. On the limbs of this U-shaped bearing support 8 are mounted the rollers 4 to 7, the guide rollers of adjacent bands being preferably mounted, as shown in Figs. 2 and 3 of the drawing, on one common support, so that on either side of the support are four rollers and therefore, in the preferred construction illustrated, eight rollers on each support. According to the invention the support carrying the rollers is slidable on guide rails 9 which are disposed below the cutter beam 12 and are arranged at an invariable distance from one another. For securely holding the guiding support in the vertical position, according to Figs. 2 and 3 each guiding support travels along two adjacent guide rails 9, each inner guiding rail serving for carrying two supports. The guiding supports 8 which are independent of the cutter beam 12 and are supported completely independently on the guide rails 9 are according to the invention connected to the cutter beam 12 solely by means of a driver. In the preferred constructional form illustrated this driver consists of a guiding pin 10 which is journalled in each support 8 and with its upper end or with a collar 10a engages in a longitudinal groove 11 of the cutter beam.

The manner in which the new guiding means for the conveyer bands operates will be obvious from the drawing. It will be seen from Figs. 2 and 4 that, on the cutting device being slued round, that is to say on the cutter beam 12 being slued round the point 13, the individual supports 8 are displaced on the guide rails 9, the distance apart at right angles to the conveyer bands not being changed, however. Thus the entire width of the conveyer bands can be fully utilized at every cut, that is to say, even when the cutting device is in its most oblique position according to Fig. 4. Any jamming of the guiding parts for the conveyer bands and any disturbance caused thereby cannot occur with the new very simple and stable manner of construction.

For bridging over the distance between the guide rollers 4 to 7 and the cutting place 2, 3, which is always present, and for guiding the paper web or the cut sheets, sheet metal guides 14 and 15, and, if desired, also guide rollers 18, are provided, which are fixed to the limbs of each support 8. In order that these sheet metal guides shall not come in contact with the cutters or their supporting members, when the cutting device is slued, the sheet metal guides are preferably cut obliquely, as indicated at 16 and 17.

The invention is applicable not only to transverse cutters of the kind shown, but may also be used with transverse cutters in which the conveyer bands are taken through the cutter beam.

What I claim is:—

1. A self-adjusting paper feeding means in connection with transverse and diagonal cutters for paper-cutting machines, comprising in combination a cutter beam capable of being slued in a horizontal plane, cutters on the beam, conveyer bands for supporting and feeding the paper to the cutter beam and for conveying the cut-off pieces away from the same, guide rollers for guiding the conveyer bands approximately at the height of the cutters on the beam and guide rollers at the height of the lower part of the cutter beam for guiding the conveyer bands round under the cutter of the beam and bearings for all these guide rollers, the bearings for the guide rollers situated in the immediate neighbourhood of the cutter beam being independently slidable in the longitudinal direction of the conveyer bands on guide rails while remaining at a constant distance apart in the transverse direction of the conveyer bands.

2. A self-adjusting paper feeding means in connection with transverse and diagonal cutters for paper-cutting machines, comprising in combination a cutter beam capable of being swung in a horizontal plane, cutters on the beam, conveyer bands for supporting and feeding the paper to the cutter beam and for conveying the cut-off pieces away from the same, guide rollers for guiding the conveyer bands approximately at the height of the cutters on the beam and guide rollers at the height of the lower part of the cutter beam for guiding the conveyer bands round under the cutter of the beam, bearings for all these guide rollers and guide rails under the cutter beam arranged parallel to one another for independently guiding the bearings for the guide rollers situated in the immediate neighbourhood of the cutter beam.

3. A self-adjusting paper feeding means in connection with transverse and diagonal cutters for paper-cutting machines, comprising in combination a cutter beam capable of being slued round, cutters on the same, conveyer bands for supporting and feeding the paper to the cutter beam and for conveying the cut-off pieces away from the same, guide rollers for guiding the conveyer bands approximately at the height of the cutters on the cutter beam and guide rollers at the height of the lower part of the cutter beam for guiding the conveyer bands round under the cutter of the cutter beam, bearings for all these guide rollers, a plurality of U-shaped bow members embracing the cutter beam, each bow member supporting bearings for all those guide rollers of a conveyer band, which are disposed in the immediate neighbourhood of the cutter beam, guide rails below the cutter beam, which are arranged parallel to one another, for guiding the said bow members and connecting members between the U-shaped bow members and the cutter beam.

4. A self-adjusting paper feeding means in connection with transverse and diagonal cutters for paper-cutting machines, comprising in combination a cutter beam capable of being slued round, cutters on the same, conveyer bands for supporting and feeding the paper to the cutter beam and for conveying the cut-off pieces away from the same, guide rollers for guiding the conveyer bands approximately at the height of the cutters on the cutter beam and guide rollers at the height of the lower part of the cutter beam for guiding the conveyer bands round under the cutter of the cutter beam, bearings for all these guide rollers, a plurality of U-shaped bow members embracing the cutter beam, each bow member supporting bearings for all those guide rollers of two adjacent conveyer bands, which are disposed in the immediate neighbourhood of the cutter beam, guide rails below the cutter beam, which are arranged parallel to one another, for guiding the said bow members and connecting members between the U-shaped bow members and the cutter beam.

5. A self-adjusting paper feeding means in connection with transverse and diagonal cutters for paper-cutting machines, comprising in combination a cutter beam capable of being slued round, cutters on the same, conveyer bands for supporting and feeding the paper to the cutter beam and for conveying the cut-off pieces away from the same, guide rollers for guiding the conveyer bands approximately at the height of the cutters on the cutter beam and guide rollers at the height of the lower part of the cutter beam for guiding the conveyer bands round under the cutter of the cutter beam, bearings for all these guide rollers, a plurality of U-shaped bow members embracing the cutter beam, each bow member supporting bearings for all those guide rollers of two conveyer bands, which are disposed in the immediate neighbourhood of the cutter beam, guide rails below the cutter beam, which are arranged parallel to one another, each three guide rails guiding two of the said U-shaped bow members and connecting members between the U-shaped bow members and the cutter beam.

6. A self-adjusting paper feeding means in connection with transverse and diagonal cutters for paper-cutting machines, comprising in combination a cutter beam capable of being slued round, cutters on the same, conveyer bands for supporting and feeding the paper to the cutter beam and for conveying the cut-off pieces away from the same, guide rollers for guiding the conveyer bands approximately at the height of the cutters on the cutter beam and guide rollers at the height of the lower part of the cutter beam for guiding the conveyer bands round under the cutter of the cutter beam, bearings for all these guide rollers, a plurality of U-shaped bow members embracing the cutter beam, each bow member supporting bearings for all those guide rollers of two conveyer bands, which are disposed in the immediate neighbourhood of the cutter beam, guide rails below the cutter beam, which are arranged parallel to one another, each three guide rails guiding two of the said U-shaped bow members and guiding pins as connecting members between the U-shaped bow members and the cutter beam.

7. A self-adjusting paper feeding means in connection with transverse and diagonal cutters for paper-cutting machines, comprising in combination a cutter beam capable of being slued round, cutters on the same, conveyer bands for supporting and feeding the paper to the cutter beam and for conveying the cut-off pieces away from the same, guide rollers for guiding the conveyer bands approximately at the height of the cutters on the cutter beam and guide rollers at the height of the lower part of the cutter beam for guiding the conveyer bands round under the cutter of the cutter beam, bearings for all these guide rollers, a plurality of U-shaped bow members embracing the cutter beam, each bow member supporting bearings for all those guide rollers of two conveyer bands, which are disposed in the immediate neighbourhood of the cutter beam, guide rails below the cutter beam, which are arranged parallel to one another, each three guide rails guiding two of the said U-shaped bow members, sheet metal guides at the height of the upper guide rollers on the U-shaped bow members, and guide pins as connecting members between the U-shaped bow members and the cutter beam.

8. A self-adjusting paper feeding means in connection with transverse and diagonal cutters for paper-cutting machines, comprising in combination a cutter beam capable of being slued round, cutters on the same conveyer bands for supporting and feeding the paper to the cutter beam and for conveying the cut-off pieces away from the same, guide rollers for guiding the conveyer bands approximately at the height of the cutters on the cutter beam and guide rollers at the height of the lower part of the cutter beam for guiding the conveyer bands round under the cutter of the cutter beam, bearings for all these guide rollers, a plurality of U-shaped bow members embracing the cutter beam, each bow member supporting bearings for all those guide rollers of two conveyer bands, which are disposed in the immediate neighbourhood of the cutter beam, guide rails below the cutter beam, which are arranged parallel to one another, each three guide rails guiding two of the said U-shaped bow members, sheet metal guides at the height of the upper guide rollers on the U-shaped bow members, guide rollers for the paper on the U-shaped bow members and guide pins as connecting members between the U-shaped bow members and the cutter beam.

HEINRICH WAMSER.